W. H. & W. J. CLARK.

CAN.

No. 10,530. Reissued Oct. 14, 1884.

Witnesses:

Geo. L. Wheelock

Victor A. Lewis

Inventors.

William H. Clark 2nd

William J. Clark

By Knight Bros attys.

N. PETERS, Photo-Lithographer, Washington, D. C.

UNITED STATES PATENT OFFICE.

WILLIAM H. CLARK AND WILLIAM J. CLARK, OF SALEM, OHIO.

CAN.

SPECIFICATION forming part of Reissued Letters Patent No. 10,530, dated October 14, 1884.

Original No. 302,683, dated July 29, 1884. Application for reissue filed September 20, 1884.

*To all whom it may concern:*

Be it known that we, WILLIAM H. CLARK and WILLIAM J. CLARK, both of Salem, Columbiana county, Ohio, have jointly invented a new and useful Improvement in Cans, of which the following is a specification.

Our invention relates to an improved construction of those composite cans or buckets in which there is associated with a sheet-metal body a bottom which consists partly of wood.

Our invention is especially designed as an improved manufacture in the class of "fluid-cans" illustrated in subject-matter of the Patent No. 272,647, granted to us on the 20th of February, 1883, and to which reference may be made for details not specifically described herein.

Figure 1:
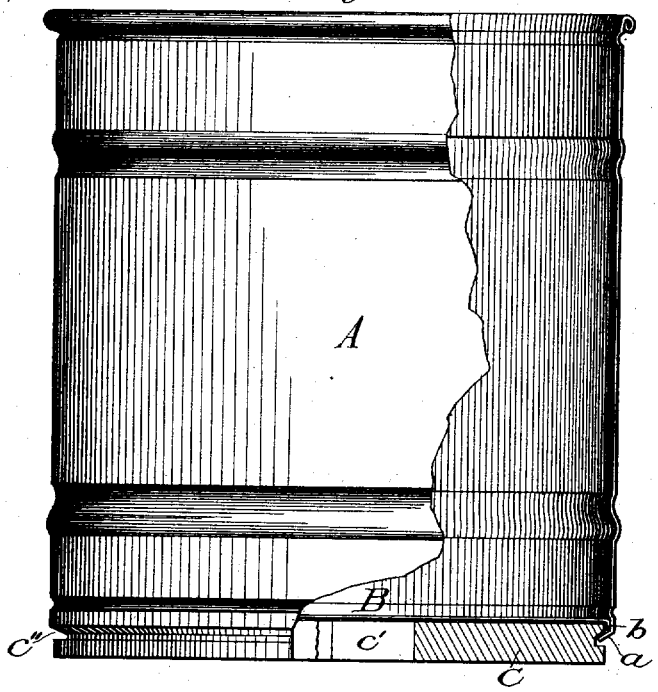
Figure 2:
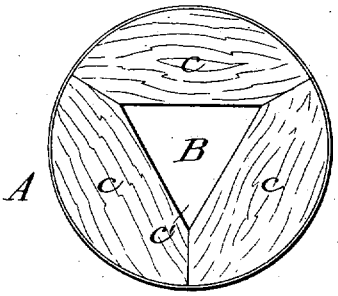
Figure 3:
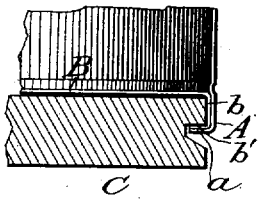

In the accompanying drawings, Figure 1 is a partly sectioned elevation of a composite can or vessel embodying our present invention. Fig. 2 is an under side view of the same to a smaller scale. Fig. 3 is a vertical section of our preferred form of bottom.

A represents a sheet-metal can-body, which is preferably of the cylindrical form here shown, but may have the shape of a conic frustum or other form, if preferred.

B represents the can-bottom proper, also of sheet metal, having a downturned lip or margin, *b*, which embraces the upper portion of the periphery of a wooden or supplementary bottom, C, which may be composed of several segments, *c c c*, as shown, or may consist of a single piece of timber. When of several pieces or segments, said supplementary bottom may have a central opening, as at *c'*. We prefer to provide the downturned lip or margin *b* with an inturned edge, *b'*, to occupy the upper part of the circumferential groove *c''*, as shown in Fig. 3. This groove also receives the inturned lower edge, *a*, of the body.

It will be seen that instead of using key-pins or wedges to force the segmental blocks out against the confining-flange, as in our aforesaid patent, the flange is itself constructed upon and its lower edge incised or forced into a circumferential groove in the periphery of the wooden bottom; but such key-pins or wedges may nevertheless be added, if desired, though our experience with the present construction shows such wedges to be unnecessary.

It is further apparent that the depending edge or lip of the metal bottom is tightly held between the periphery of the wooden bottom and the described confining inturned body-flange, which is also constructed upon said periphery at the same time with the said lip.

We claim as new and of our invention—

1. A composite sheet-metal can or vessel consisting of the sheet-metal bottom B, having downturned lip or margin *b*, supplementary wooden bottom C, having a circumferential groove in its periphery, and a sheet-metal body, A, having inturned lower edge, *a*, the downturned lip or margin embracing the wooden bottom, and the inturned lower edge occupying the circumferential groove, as shown and described.

2. A composite can-bottom consisting of bottom proper, B, of sheet metal, having a downturned lip or margin, *b*, and inturned edge *b'*, and wooden bottom C, having circumferential groove *c''*, capable of receiving the inturned edge of the body outside of the inturned edge of the bottom proper, as set forth.

In testimony of which invention we hereunto set our hands.

WILLIAM H. CLARK.
WILLIAM J. CLARK.

Witnesses:
W. W. HOLE,
KITTY M. CALLAHAN.